United States Patent
Gebke (10) Patent No.: US 6,958,011 B2
(45) Date of Patent: Oct. 25, 2005

(54) PLIABLE AIR DUCT WITH DUST AND CONDENSATION REPELLENCY

(75) Inventor: Kevin J. Gebke, Dubuque, IA (US)

(73) Assignee: Rite-Hite Holding Corp., Milwaukee, WI (US)

(*) Notice: Subject to any disclaimer, the term of this patent is extended or adjusted under 35 U.S.C. 154(b) by 0 days.

(21) Appl. No.: 10/441,904

(22) Filed: May 19, 2003

(65) Prior Publication Data

US 2004/0029522 A1 Feb. 12, 2004

Related U.S. Application Data

(63) Continuation-in-part of application No. 09/951,717, filed on Sep. 13, 2001, now Pat. No. 6,565,430.

(51) Int. Cl.[7] .............................................. F24F 7/00
(52) U.S. Cl. ...................... 454/306; 454/903; 454/296
(58) Field of Search ............................... 454/298, 296, 454/306, 334

(56) References Cited

U.S. PATENT DOCUMENTS

| | | | |
|---|---|---|---|
| 3,195,296 A | | 7/1965 | Janson |
| 3,357,088 A | | 12/1967 | Hoffman |
| 3,607,341 A | * | 9/1971 | Goins et al. ................. 442/374 |
| 3,911,962 A | * | 10/1975 | Chomat et al. ............. 138/125 |
| 3,940,917 A | * | 3/1976 | Strachan ...................... 57/207 |
| 4,017,282 A | * | 4/1977 | Zahka et al. ................... 55/428 |
| 4,463,483 A | * | 8/1984 | Holm .......................... 26/29 P |
| 4,699,133 A | * | 10/1987 | Schafer et al. ................ 602/77 |
| 4,951,366 A | * | 8/1990 | Geller ........................... 26/28 |
| 5,024,877 A | * | 6/1991 | McCullough et al. ......... 442/38 |
| 5,095,942 A | | 3/1992 | Murphy |
| 5,111,739 A | | 5/1992 | Hall |
| 5,123,595 A | | 6/1992 | Doss |
| 5,167,577 A | | 12/1992 | Kristensson |
| 5,368,341 A | | 11/1994 | Larson |
| 5,401,793 A | * | 3/1995 | Kobayashi et al. ......... 524/401 |
| 5,490,813 A | | 2/1996 | Danielsen |

(Continued)

FOREIGN PATENT DOCUMENTS

EP  0175892  4/1996

(Continued)

*Primary Examiner*—Derek S. Boles
(74) *Attorney, Agent, or Firm*—Hanley, Flight & Zimmerman, LLC (57) ABSTRACT

A fabric air duct with main discharge openings includes additional, much smaller openings that help ventilate the surface of the duct. Ventilating the surface of the duct with a slight yet even amount of airflow helps inhibit the accumulation of condensate and dust on the surface of the duct. In some embodiments, the duct includes a pliable sheet consisting of a rather porous fabric base material. To achieve an appropriately low level of airflow, a plastic coating on the fabric reduces, but does not eliminate the fabric's porosity. A calendering process then reduces the porosity even further. In some embodiments, the calendering process occurs before the plastic coating process. In other embodiments, the pliable sheet is substantially air impermeable, except for its main discharge openings. The sheet is then perforated with numerous smaller openings to achieve the desired amount of surface ventilation. In yet other embodiments, an emorizing or sueding process is used to abrade or nap the surface of a porous or non-porous base material to create a pliable sheet having a desired amount of porosity. From any of these processes, air ducts of various shapes may be formed, including air ducts that are circular, ½ round, and ¼ round in shape, as well as air ducts having a non-uniform cross-sectional shape across their lengths.

28 Claims, 9 Drawing Sheets

U.S. PATENT DOCUMENTS

| | | |
|---|---|---|
| 5,655,963 A | 8/1997 | Paschke |
| 5,725,427 A | 3/1998 | Koerber |
| 5,769,708 A | 6/1998 | Paschke |
| 5,782,689 A * | 7/1998 | Woolsey et al. ............ 454/296 |
| 5,855,154 A | 1/1999 | Schakel et al. |
| 5,961,044 A | 10/1999 | Dalbec |
| 5,996,281 A | 12/1999 | Takano |
| 6,002,333 A | 12/1999 | Hickey |
| 6,280,320 B1 | 8/2001 | Paschke |

FOREIGN PATENT DOCUMENTS

| | | |
|---|---|---|
| EP | 0840072 | 5/1998 |
| EP | 0899519 | 3/1999 |
| FR | 2713317 | 6/1995 |
| JP | 63-003143 | 1/1988 |
| JP | 03-110342 | 5/1991 |
| JP | 06094295 | 4/1994 |

* cited by examiner

PLIABLE AIR DUCT WITH DUST AND CONDENSATION REPELLENCY

CROSS REFERENCE TO RELATED APPLICATIONS

This application is a continuation-in-part of U.S. application Ser. No. 09/951,717, filed on Sep. 13, 2001, now U.S. Pat. No. 6,565,430.

BACKGROUND OF THE INVENTION

1. Field of the Invention

The subject invention generally pertains to pliable air ducts and more specifically to the air permeability of such a duct.

2. Description of Related Art

In HVAC systems (heating, ventilating, air conditioning), conditioned supply air discharged from a blower is often conveyed to various rooms or areas within a building by way of ductwork. Conventional ductwork is typically formed of sheet metal and is often installed above ceilings for convenience and aesthetics. But in warehouses, manufacturing plants and many other buildings, the ducts are suspended from the roof of the building and are thus exposed. This not only creates a poor appearance in many cases, but can create other problems as well.

For example, temperature differentials between an air duct and the air on either side of the duct wall can create condensation on both the interior and exterior of the duct. The presence of condensed moisture on the interior of the duct may form mold or bacteria that the duct then passes onto the room or other areas being supplied with the conditioned air. If an exposed sheet metal duct conveys relatively cool air, condensation can form on the exterior of the duct. The condensate may then drip onto the floor, inventory, and personnel below. The consequences of the dripping can range anywhere from a minor irritation to a dangerously slippery floor for the personnel, or complete destruction of the products it may drip on (especially in food-processing facilities).

Further, metal ducts with localized discharge registers have been known to create uncomfortable drafts and unbalanced localized heating or cooling within the building. In many food-processing facilities where the target temperature is 42 degrees Fahrenheit, a cold draft can be especially uncomfortable and perhaps unhealthy.

Many of the above problems associated with exposed metal ducts are overcome by the use of fabric ducts, such as DUCTSOX fabric ducts by Frommelt Safety Products Corporation of Milwaukee, Wis. Such ducts typically have a fabric wall that is air-permeable to broadly and evenly disperse the air into the room being conditioned or ventilated. If greater airflow in needed in certain areas, the fabric duct can be provided with additional discharge openings, such as air registers or cutouts in the fabric.

The porosity of conventional fabric can pass a substantial amount of air, which can be desirable in many applications where the airflow through the pores of the fabric is used primarily for evenly dispersing air into a room. However, some applications require airflow that is more directed toward certain areas of a room. In such cases, it may be desirable to have relatively large discharge openings provide most of the air airflow, while the pores of the fabric provide only enough airflow to inhibit dust and condensation from accumulating on the outer surface of the fabric material.

Unfortunately, it can be difficult to acquire an air duct material whose porosity provides an appropriately small amount of airflow, such as 2 cfm (two cubic feet per minute of air across one square-foot of material subject to a 0.02 psi air pressure differential). Standard fabric materials have been found to pass 40 cfm or more. Such materials have been calendered in an attempt to reduce the materials porosity. Although calendering conventional fabric does reduce its porosity temporarily, much of the effect is lost after the material is washed. Thus, simply calendering just any porous fabric is not a permanent solution to the problem.

SUMMARY OF THE INVENTION

An air duct consists of an air permeable material that passes air therethrough at a flow rate that is substantially less than what the air duct discharges through other larger openings.

In some embodiments, an air duct is made of a porous fabric that is plastic coated to reduce, but not eliminate, the fabric's porosity.

In some embodiments, an air duct includes a pliable sheet that includes a porous fabric base. The sheet is coated with a plastic that renders the sheet substantially impermeable to air. The sheet is provided with discharge openings for supplying air to a room, and is perforated with much smaller openings that help inhibit the formation of condensation or inhibit the accumulation of dust.

In some embodiments, an air duct with primary discharge openings and much smaller pores or perforations is made of a fabric with anti-microbial properties.

In some embodiments, an air duct is made of a plastic coated porous fabric that is calendered to reduce the fabric's porosity.

In some embodiments, the an air duct is made of a fabric sheet having numerous minute pores or perforations that convey only one to four $CFM/ft^2$ (cubic feet per minute per square-foot of material) when a 0.02 psia pressure differential exists across the sheet.

In some embodiments, an air duct material is perforated by displacing material rather than by removing a significant portion of it. Displacing material not only helps reinforce the periphery of each perforation, but also helps reduce the amount of scrap during the perforating process.

In some embodiments, an air duct includes a fabric sheet having a base material of polyester for strength and porosity, and having an acrylic or polyurethane coating to reduce or eliminate the base material's porosity.

In other examples, an air duct comprises a pliable sheet configured to convey air, wherein the pliable sheet has a porosity formed by an emorizing or sueding process, wherein the pliable sheet includes a plurality of discharge openings that each provide a first area and wherein the porosity of the pliable sheet provides a plurality of second areas, with the first area being greater than the second open area.

In some examples, an air duct, comprises a pliable sheet configured to convey air, wherein the pliable sheet includes a fabric base material that is porous and a plastic coating on the fabric base material that reduces the porosity of the fabric base material yet leaves the pliable sheet porous, wherein the pliable sheet includes a plurality of discharge openings that provide a first open area and the porosity of the pliable sheet provides a second open area with the first open area being greater than the second open area.

In some yet other examples, a method of creating an air duct comprises applying pressure to a pliable sheet having a porosity below a desired porosity to increase the porosity of the pliable sheet to the desired porosity; and configuring the pliable sheet to convey air.

In some examples, a method of creating an air duct comprises applying pressure to a pliable sheet to decrease a porosity of the pliable sheet; after the application of the pressure, applying a plastic coating to the pliable sheet; and configuring the pliable sheet to convey air.

DESCRIPTION OF THE PREFERRED EMBODIMENT

Figure 1:
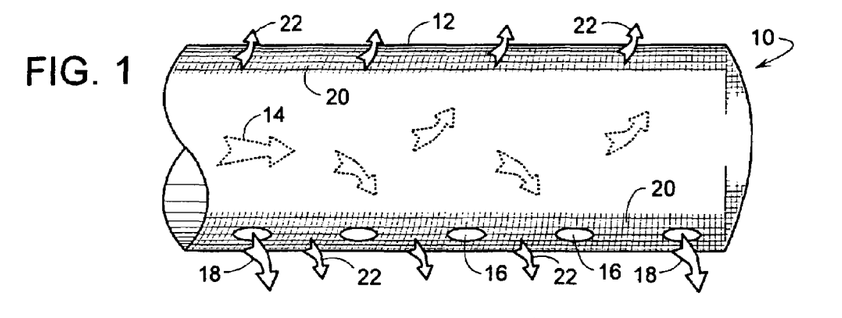
FIG. 1 is a partial side view of one embodiment of a fabric air duct that is able to inhibit at least some accumulation of dust or condensate.

An air duct 10, shown in FIG. 1, consists of a pliable sheet 12 in a tubular shape. Duct 10 is adapted to be suspended overhead to convey forced air 14 from a blower to specific rooms or desired areas within a building. Depending on the application, the air may be for ventilation purposes only, or may be conditioned by heat, cooling, filtering, humidifying, dehumidification, and various combinations thereof.

Most of the air delivered to the rooms comes from discharge openings 16 in duct 10, as indicated by airflow arrows 18. Openings 16 can assume a variety of forms including, but not limited to cutouts, discharge registers, and screens.

To help inhibit condensation or dust from accumulating on the surface of duct 10, the fabric wall between discharge openings 16 is provided with another set of much smaller openings 20. Openings 20 allow the fabric wall of the duct to breathe in the areas between discharge openings 16. A slight current of air 22 passing outward through the duct wall may help keep dust from settling on the exterior of the duct. But also, when duct 10 is conveying cool air, a small current of cool air passing through the duct's fabric wall tends to keep the warmer room air slightly away from the exterior surface of duct 10. Thus, moisture in the warmer room air is less likely to condense on the surface of duct 10.

The actual size, number, and spacing of smaller openings 20 can vary; however, there does appear to be an optimum design range. The relative open areas of openings 16 and 20 should allow about ten percent (preferably less than more) of supply air 14 to pass through smaller openings 20 and about ninety percent through discharge openings 16. Sheet 12 should preferably pass one to four $CFM/ft^2$ with a 0.02-psi pressure differential across sheet 12 (i.e., 0.02 pounds per square inch of air pressure should force one to four cubic feet of air across a one square-foot of sheet material every minute). Higher airflow rates through smaller openings 20 reduce the amount of air that discharge openings 16 can direct to specific areas, while lower airflow rates are less effective at reducing condensation or dust. In some cases, positive results are achieved when openings 16 are able to pass more than twenty times as much air as smaller openings 20. Moreover, the distribution of openings 20 should be sufficiently dense to provide an even flow of air through sheet 12. To avoid having smaller openings 20 direct too much airflow in any particular direction, openings 20 are preferably distributed over nearly the full circumference or perimeter of duct 10.

Figure 2:
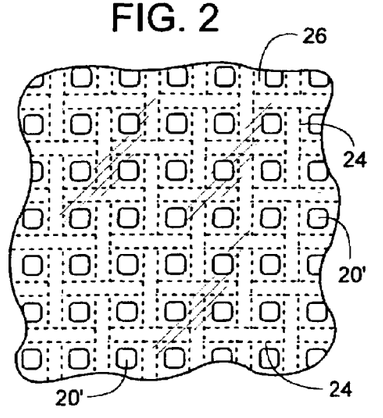
FIG. 2 is an enlarged view of the fabric used in the air duct of FIG. 1, but with the fabric shown prior to it being compressed.
Figure 3:
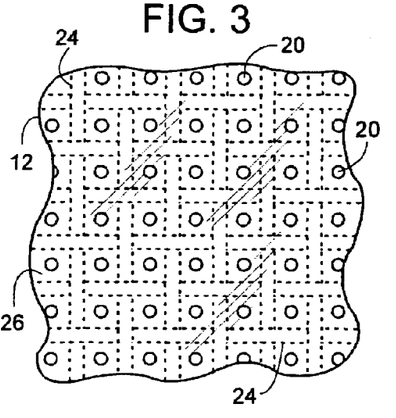
FIG. 3 shows the fabric of FIG. 2, but after the fabric is compressed to reduce its porosity.

To achieve appropriate airflow characteristics, sheet 12 may consist of a fabric base material 24 with a plastic coating 26, as shown in FIG. 2. In some embodiments, fabric 24 is a porous woven material, such as polyester. Coating 26, such as an acrylic or polyurethane coating, is applied to fabric base 24 to reduce but not eliminate the porosity of sheet 12. If the resulting openings 20' are too large, as shown in FIG. 2, compressing or calendering sheet 12 can reduce their size. Compressing sheet 12 forces coating 26 into openings 20' until the open area of openings 20' are reduced as indicated by openings 20 of FIG. 3. Coating 26 tends to maintain the desired size of openings 20' even after the material is washed.

Figure 4:
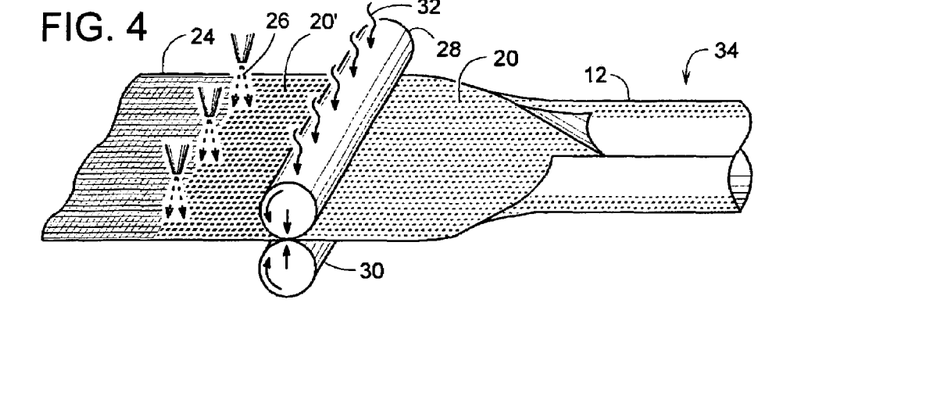
FIG. 4 schematically illustrates a process of producing a fabric air duct that is able to inhibit at least some accumulation of dust or condensate.

The process of producing sheet 12 is schematically illustrated in FIG. 4. Applying coating 26 is schematically illustrated to encompass conventional coating processes that are well known to those skilled in the art. Reducing the size of openings 20' by compression can be achieved by a calendering process where sheet 12 is compressed between two rollers 28 and 30. In some cases, applying heat 32 to at least one of the rollers softens coating 26, which may help in permanently reducing the size of openings 20'. Once openings 20 are of an appropriate size, sheet 12 can be formed into a tubular shape 34. In some cases, coating 26 and/or fabric material 24 provides appreciable antimicrobial properties as determined by standard tests, such as AATCC Method 100 (where AATCC stands for the American Association of Textile Chemist and Colorists, of Research Triangle Park, N.C.). Coating 26 and/or fabric material 24 can also render sheet 12 flame retardant, whereby sheet 12 is self-extinguishing.

Figure 5:
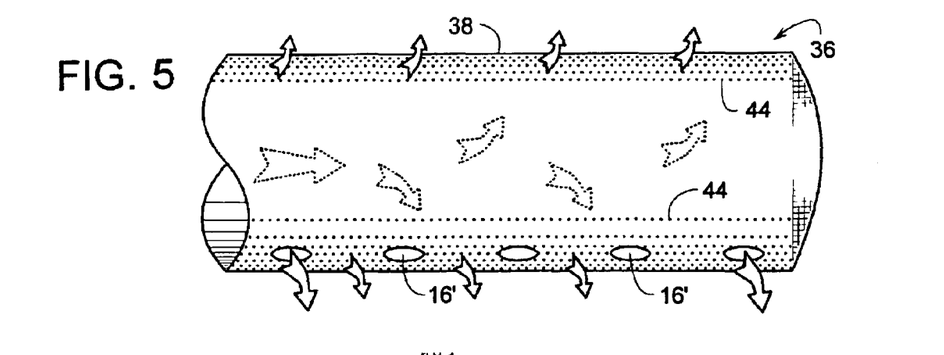
FIG. 5 is a partial side view of another embodiment of a fabric air duct that is able to inhibit at least some accumulation of dust or condensate.
Figure 6:
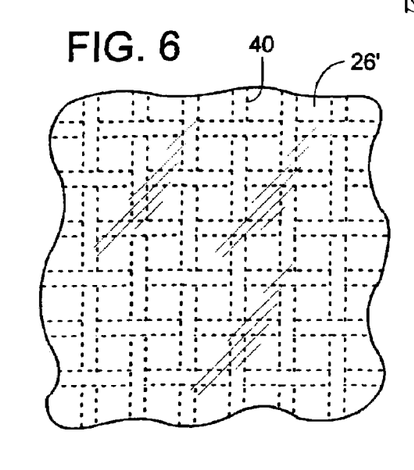
FIG. 6 is an enlarged view of the fabric used in the air duct of FIG. 5, but with the fabric shown prior to it being perforated.
Figure 7:
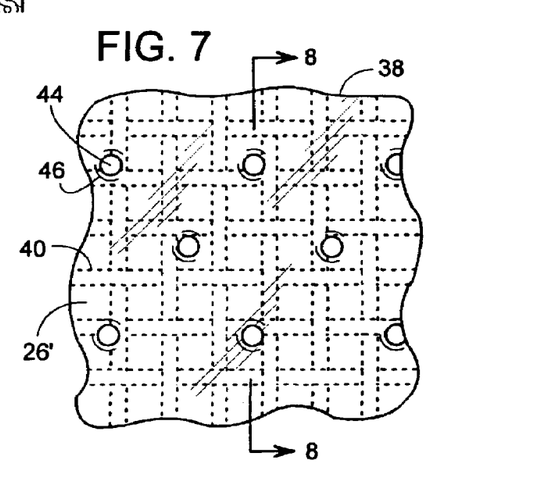
FIG. 7 shows the fabric of FIG. 6, but after the fabric is perforated.
Figure 8:
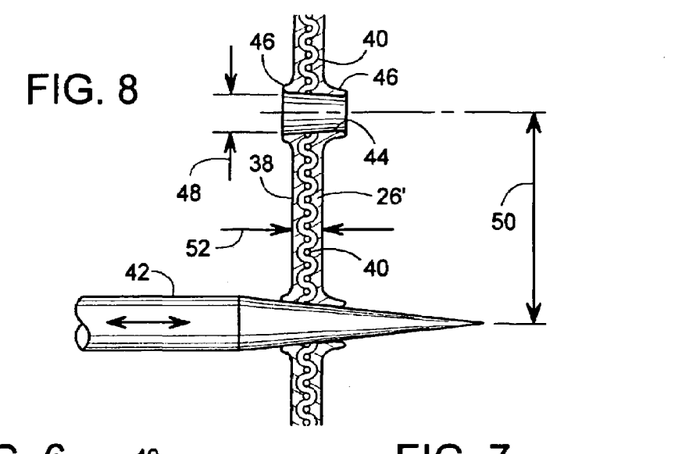
FIG. 8 is a cross-sectional view taken along line 8—8 of FIG. 7 while the fabric is being perforated.

In an alternate embodiment, shown in FIGS. 5–8, a duct 36 includes a pliable sheet 38 that may begin as a porous fabric base material 40. The fabric base material 40 is then sealed with a plastic coating 26', which substantially eliminates the porosity of sheet 38, as shown in FIG. 6. To allow sheet 38 to breathe, a tool 42 perforates sheet 38 to create numerous perforations 44 that are significantly smaller than discharge openings 16', as shown in FIGS. 5 and 8. In some embodiments, tool 42 is a needle that creates perforations 44 by displacing material, rather than by just removing material. In this way, built-up material 46 forms around the periphery of each perforation 44, with the volume of material 46 being generally equal to the void of each perforation 44. Such a process reduces scrap and at the same time may avoid weakening a perforation's circumference.

Just as with the embodiment of FIGS. 1–4, the size, number, shape and spacing of perforations 44 of FIGS. 5–8 can vary. However, in preferred embodiments, perforations 44 have an open span 48 or effective diameter of less than 0.1 inches and are distributed at a spacing 50 that is greater than a nominal thickness 52 of sheet 38 but less than 0.5 inches. The term, "effective diameter" equals the square-root of a hole's open area times two and divided by the square-root of one divided by pi (effective diameter=$2(A/3.14)^{0.5}$). In some cases, desirable results may be achieved when the effective diameter of perforations 44 is less than thickness 52, and perforations 44 have a distribution of 100 to 2000 perforations per square-inch.

Figure 9:
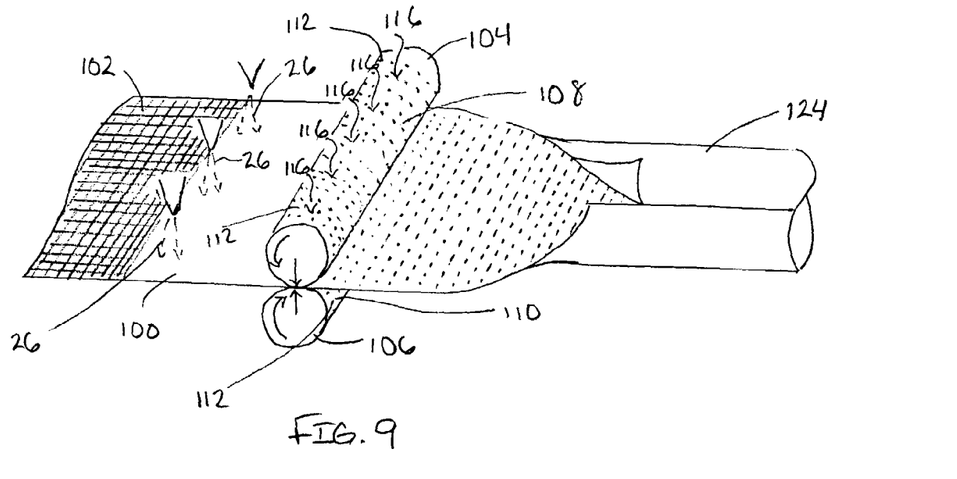
FIG. 9 schematically illustrates a process of producing a fabric air duct that is an alternative to that shown in FIG. 4 and which may include an emorizing or sueding of a pliable sheet.
Figure 10:
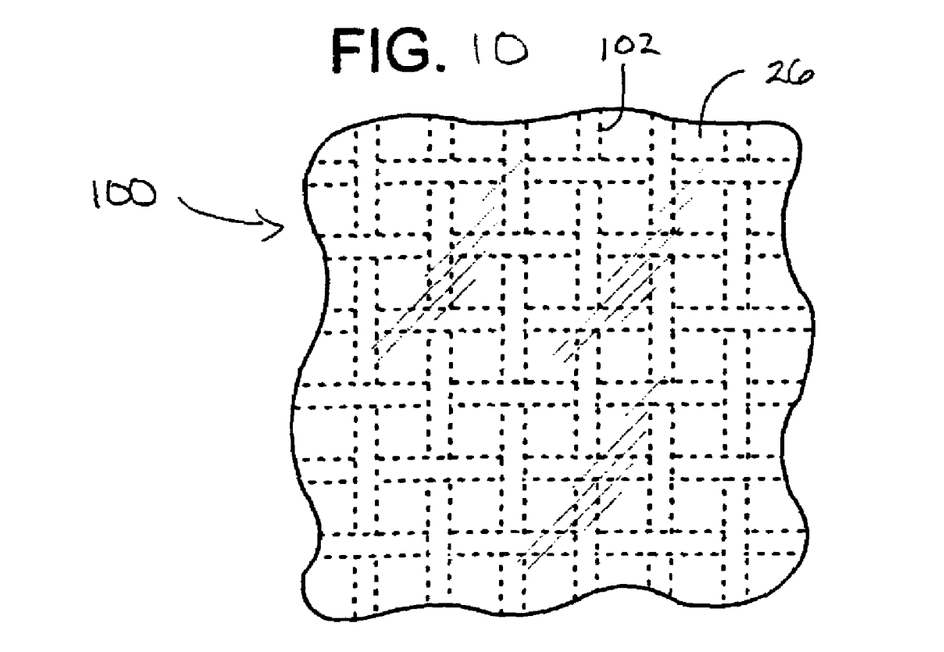
FIG. 10 is an enlarged view of the pliable sheet that may be used in the process of FIG. 9.

A technique for producing a pliable sheet, alternative to that shown in FIG. 4, is shown in FIG. 9. The technique applies pressure to a pliable sheet 100, which may be porous or non-porous prior to pressure application. The applied pressure may create porosity in the pliable sheet 100 by an emorization process whereby the outer surfaces of the pliable sheet 100 are abraded. For example, the pliable sheet 100 may include an initially porous, fabric base 102 treated with the plastic coating 26 to completely remove the porosity of the fabric base 102, as shown in FIG. 10. The coating 26 may alternatively leave the coated pliable sheet 100 partially porous, similar to the illustrations in FIGS. 2 and 3.

The pliable sheet 100 is compressed between two rollers 104 and 106, which have abrasion surfaces, 108 and 110, respectively. The abrasion surfaces 108, 110 have protrusions 112 compressing against the surface of the pliable sheet 100 to create the desired level of porosity. Thus, the process of FIG. 9 may form porosity in a pliable sheet that has no porosity prior to the process, or it may increase porosity in a pliable sheet that has a porosity below a desired porosity. Desirable porosity levels may very and include those described hereinabove.

Figure 12:
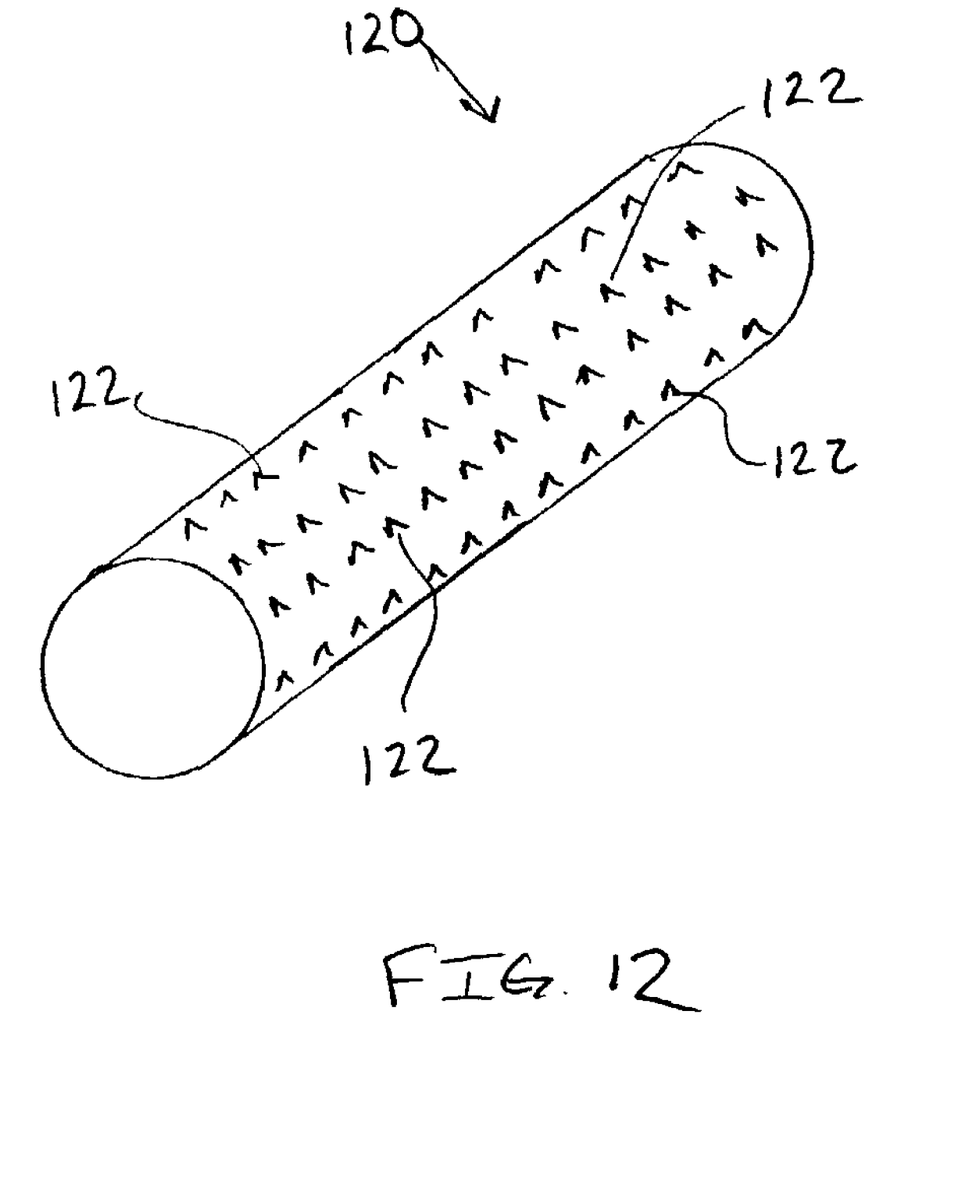
FIG. 12 is a view of a roller that may be used in a sueding process to nap a pliable sheet.

FIG. 9 may also represent a sueding process, as described below with respect to FIG. 12.

The abrasion surfaces 108 and 110 may be formed of sandpaper or other rough surfaces, such as a surface coated with industrial diamond particles. The protrusions 112 may be periodic or aperiodic. In an example, the protrusions 112 cover the entire surface 108 and 110.

Figure 11A:
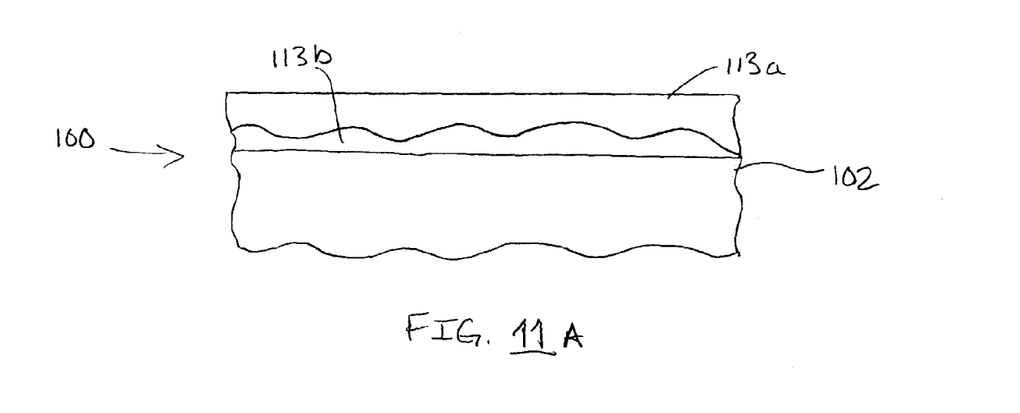
FIGS. 11A and 11B are cross-sectional views of the pliable sheet of FIG. 10 before and after an emorizing or sueding process, respectively.
Figure 11B:
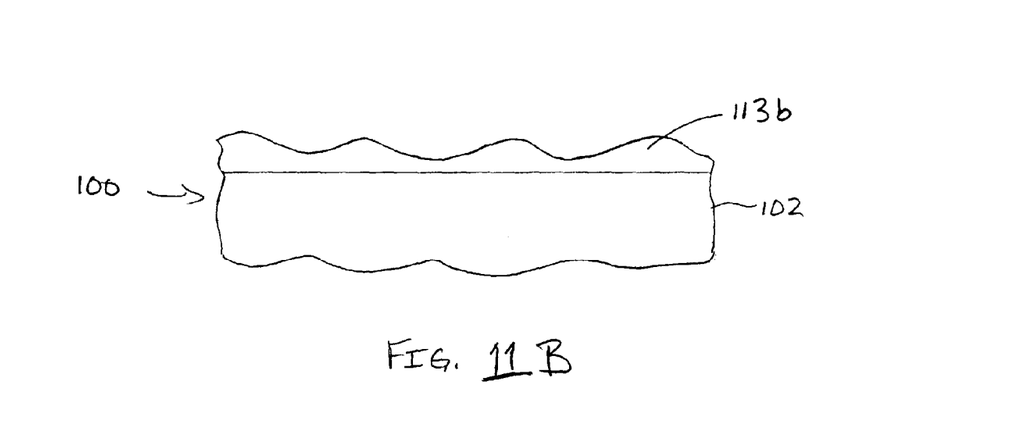

FIG. 11A illustrates the pliable sheet 100, with the fabric base layer 102 and plastic coating layers 113a and 113b. The plastic coating layers 113a and 113b result from application of the coating 26. The layer 113b represents a portion of the coating 26 that has diffused or crept into the fabric base layer 102. The remaining layer 113a is exposed on an outer surface of sheet 100. FIG. 11B illustrates the pliable sheet 100 after it has been abraded by the rollers 104, 106. In the example of FIG. 11B, the layer 113a has been completely removed by the emorizing or sueding process of FIG. 9, and the fabric base layer 102 and the imbedded coating layer 113a create the desired porosity. Alternatively, the emorizing or sueding process may abrade the pliable sheet 100 to create porosity therein—for example, if the pliable sheet 100 is non-porous or if the porosity of the pliable sheet 100 is to be increased beyond that of the its normal porosity.

Although the pliable sheet 100 is illustrated in FIG. 9 as being exposed to a plastic coating process that reduces the porosity of an already porous sheet, this process is optional. The plastic coating process also may be eliminated, for example, when the pliable sheet 100 is formed of flexible non-porous material. A further alternative technique includes applying heat 116 to the rollers 104, 106, as described above. Another technique includes abrading a single surface of the sheet 100. Further still, the pliable sheet 100 may be exposed to an additional porosity creating process, such as a perforation process, either before or after compression. Indeed, the emorizing process illustrated in FIG. 9 may be replaced with a sueding or napping process by using a roller 120 (FIG. 12) having a series of hooks or angled teeth 122 that may latch into a pliable sheet during roller compression, where this latching may catch on the pliable sheet and nap the surface thereof to create or increase porosity. In any of these examples, the porous pliable sheet formed by the rollers 104, 106 may be configured into a tubular pliable sheet 124 to convey air. Preferably, the tubular pliable sheet 124 would include discharge openings, like the discharge openings 16 in FIG. 1.

Figure 13:
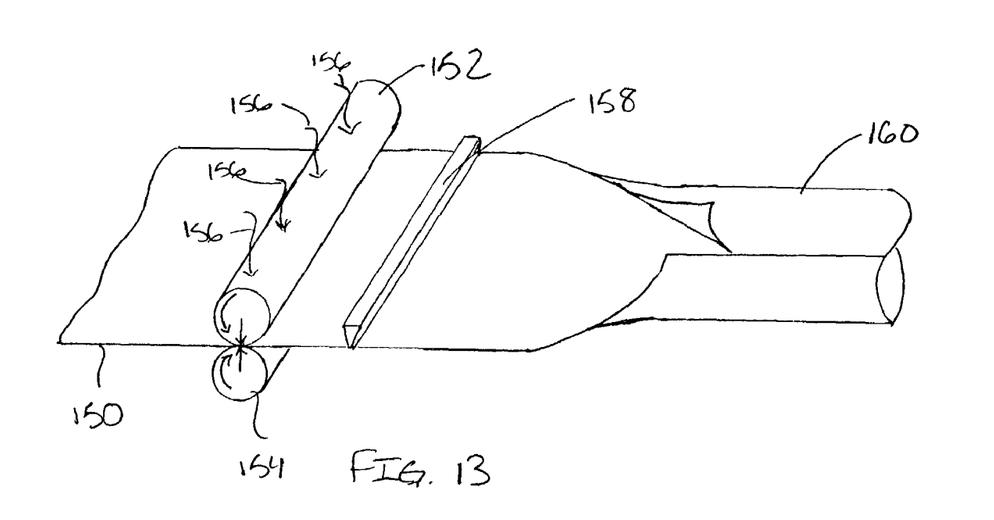
FIG. 13 schematically illustrates a calendering process alternative to that of FIG. 4, showing the calendering process occurring before a coating process.

Another suitable process is a calendering process like that of FIG. 4, but with the plastic coating process coming after the calendering process. FIG. 13 illustrates a pliable sheet 150 that is compressed between two rollers 152 and 154. The sheet 150 may or may not be porous. The rollers 152 and 154 calender the sheet 150 to reduce its porosity, for example. Heat 156 may be applied during calendaring, as described above. After calendering, a plastic coating is applied by a wedge 158 that functions somewhat like a squeegee evenly distributing the plastic coating across the top surface of the sheet 150. By calendering first, the top surface of the pliable sheet 150 may be smoothened to allow for a more even application of the plastic coating. The calenderized sheet 150 is formed into a tubular pliable sheet 160 in the illustrated example, although alternatively it may be applied to another process, such as a porosity-increasing process like that of FIG. 9 or a perforation process. As with the tubular pliable sheet 124, in an example, the tubular sheet 160 includes discharge openings.

Figure 14:
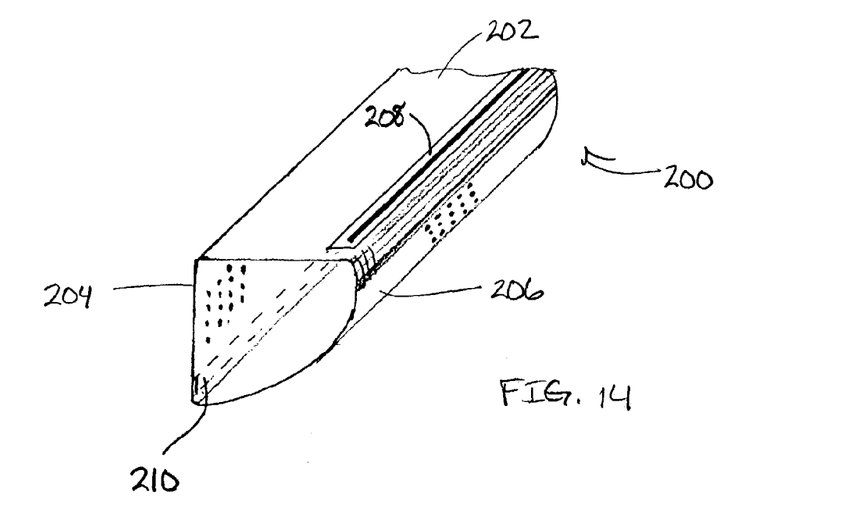
FIG. 14 is view of an air duct formed with a ¼ round cross-sectional profile.
Figure 15:
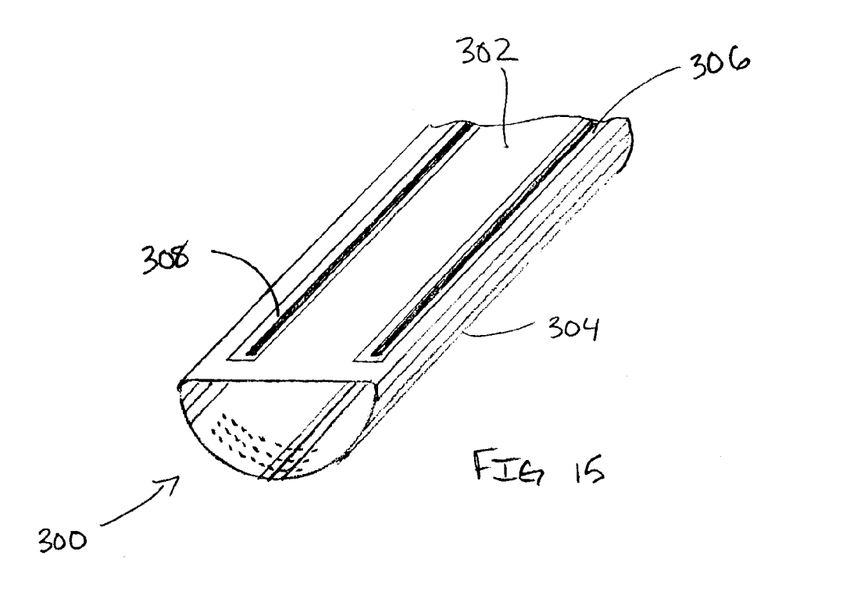
FIG. 15 is a view of an air duct formed with a ½ round cross-sectional profile.
Figure 16:
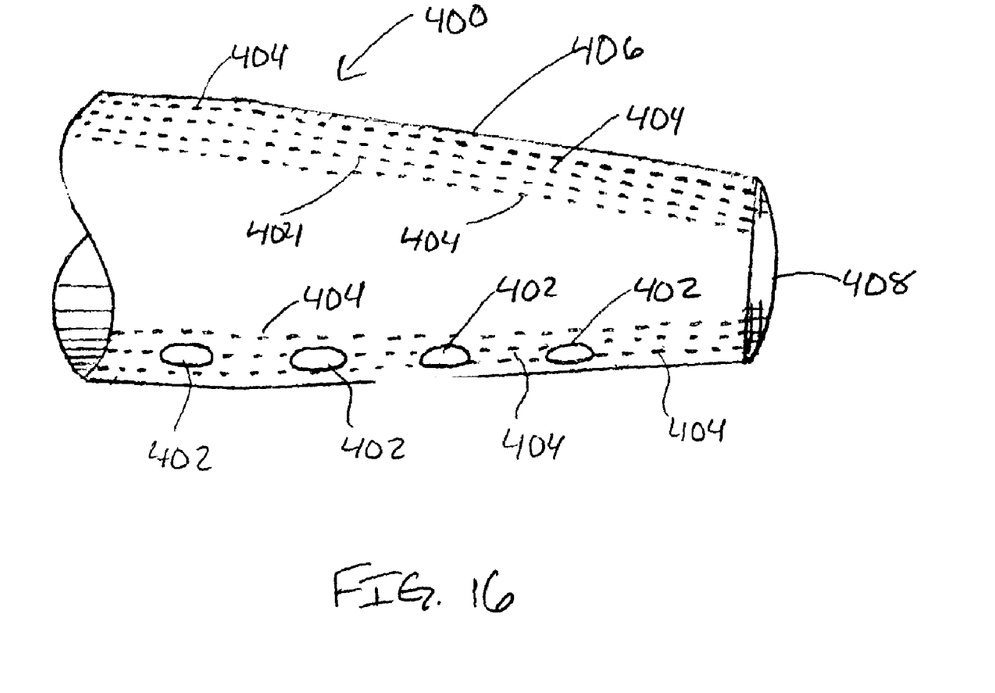
FIG. 16 is a side view of an example air duct having a non-uniform cross-sectional shape.

While the tubular pliable sheets 124 and 160 are shown having a uniform cross-sectional shape that is circular, the sheets 124 and 160 may be formed into other cross-sectional shapes and may be uniform or non-uniform across their tubular length. FIGS. 14–16 show some such example air ducts. In FIG. 14, an air duct 200 is formed having a first flat surface 202, a second flat surface 204, and a curved surface 206, collectively forming a shape having a ¼ round cross-section. The air duct 200 may be used, for example, as a duct running along a corner formed by two orthogonal support members, such as a wall and ceiling. The surfaces 202, 204, and 206 may all be porous surfaces formed through a perforation, emorizing, sueding, or calenderization process. Alternatively, some of the surfaces 202, 204, and 206 may have varying porosities including no porosity. To flatten surface 202, the surface 202 is affixed to a track 208, which may be sown in the duct 200 or mounted thereto, for example, through a button, latch, glue, or VELCRO mounting. A second track 210 is shown (in phantom) extending along wall 204. In operation, the two tracks 208, 210 are mounted against orthogonal support members, such as a wall and ceiling and the duct 200 takes a ¼ round shape. Screw or bolt fasteners may be used to mount to the support member, for example. The duct 200 may include discharge openings, not shown.

FIG. 15 shows a similar air duct in the form of ½ round cross sectional air duct 300 having a top surface 302 and a curved surface 304. The duct 300 may be formed by any of the techniques described herein and may include two tracks 306, 308 that may be mounted on a support member, such as a ceiling, to make the top surface 302 taught, a support 306 for a connector 308. The duct 300 may further include discharge openings, not shown.

FIGS. 14 and 15 show ducts with a uniform cross-sectional area and shape over a tubular length. Alternatively, an air duct may have a non-uniform area or shape. An example air duct 400 is shown in FIG. 16. The air duct 400 has a tapered profile, where discharge openings 402 and indentations 404, formed by the process of FIGS. 9, 12, or 13, extend the length of a tapered region 406. The tapered region 406 is capped by an end 408. The duct 400 is by way of example only, however—the cross-sectional shape may change across the tubular length of an duct, for example, by having a circular shape at one cross-sectional position and a ¼ round or ½ round shape at another. Other cross-sectional profiles may be achieved.

Although the invention is described with reference to a preferred embodiment, it should be appreciated by those of ordinary skill in the art that various modifications are well within the scope of the invention. For example, the pliable sheets described herein do not have to include a fabric base. The sheets could simply be a pliable air impermeable plastic sheet that is perforated with micro-perforations or pinholes to achieve desired flow characteristics. And in the case of the emorizing and sueding techniques described with reference to FIGS. 9 and 12, as well as the calendering process of FIG. 13, the pliable sheets fed to the pressuring step need not be porous at all. Therefore, the scope of the invention is to be determined by reference to the claims that follow.

I claim:

1. An air duct comprising a pliable sheet configured to convey air, wherein the pliable sheet has a porosity formed by an emorizing or sueding process, wherein the pliable sheet includes a plurality of discharge openings that each provide a first respective open area and wherein the porosity of the pliable sheet provides a plurality of second respective open areas, wherein each of the first respective open areas is greater than each of the second respective open areas.

2. The air duct of claim 1, wherein each of the first respective open areas is at least twice as great as each of the second respective open areas.

3. The air duct of claim 1, wherein the air duct has a uniform cross-sectional shape across a tubular length of the air duct.

4. The air duct of claim 3, wherein the uniform cross-sectional shape is selected from the group consisting of circular in shape, ½ round in shape, and ¼ round in shape.

5. The air duct of claim 1, wherein the air duct has a non-uniform cross-sectional shape across a tubular length of the air duct.

6. The air duct of claim 1, wherein the pliable sheet comprises a fabric base and a plastic coating on the fabric base.

7. The air duct of claim 6, wherein the fabric base is porous and the plastic coating is applied on the fabric base to substantially eliminate the porosity of the fabric base.

8. The air duct of claim 1, further comprising a track affixed to the air duct for mounting the air duct against a support member, wherein the track extends along a tubular length of the air duct.

9. A method of creating an air duct comprising:

applying pressure to a pliable sheet having a porosity below a desired porosity to increase the porosity of the pliable sheet to the desired porosity; and configuring the pliable sheet to convey air.

10. The method of claim 9, wherein the pliable sheet comprises a porous fabric base material, the method further comprising:

applying a plastic coating on the fabric base material to remove the porosity of the fabric base material; and applying pressure to the pliable sheet to increase the porosity of the pliable sheet.

11. The method of claim 10, wherein applying pressure to the pliable sheet partially removes the plastic coating from the fabric base.

12. The method of claim 10, further comprising perforating the pliable sheet.

13. The method of claim 9, further comprising emorizing the pliable sheet.

14. The method of claim 13, wherein emorizing the pliable sheet comprises pressing the pliable sheet against an abrasion surface.

15. The method of claim 9, further comprising sueding the pliable sheet.

16. The method of claim 15, wherein sueding the pliable sheet further comprises pressing the pliable sheet against a napping surface.

17. The method of claim 9, wherein the pliable sheet is non-porous before the application of the pressure.

18. The method of claim 9, wherein the pliable sheet comprises a fabric base having an air permeability and a plastic coating on the fabric base that reduces the air permeability.

19. The method of claim 9, further comprising forming the pliable sheet into a tubular length.

20. The method of claim 19, further comprising forming the pliable sheet with a uniform cross-sectional shape across the tubular length, wherein the uniform cross-sectional shape is selected from the group consisting of circular in shape, ½ round in shape, and ¼ round in shape.

21. The method of claim 19, further comprising forming the pliable sheet with a non-uniform cross-sectional shape across the tubular length.

22. The method of claim 9, further comprising heating the pliable sheet.

23. A method of creating an air duct comprising:

applying pressure to a pliable sheet to decrease a porosity of the pliable sheet;

after the application of the pressure, applying a plastic coating to the pliable sheet; and configuring the pliable sheet to convey air.

24. The method of claim 23, wherein the applying pressure includes calendering the pliable sheet.

25. The method of claim 23, further comprising heating the pliable sheet.

26. The method of claim 23, further comprising forming the pliable sheet into a tubular length.

27. The air duct of claim 1, wherein when attached to a supply air source, the plurality of porous openings allow no more than about ten percent of the supply air to pass through the porous openings.

28. The air duct of claim 1, wherein each of first respective open areas is substantially similar, and wherein each of the second respective open areas is substantially similar.

* * * * *